United States Patent

[11] 3,549,802

[72] Inventors Karol Siwko;
Joseph Edward Thomas, Batavia, N.Y.
[21] Appl. No. 729,767
[22] Filed May 16, 1968
[45] Patented Dec. 22, 1970
[73] Assignee Sylvania Electric Products Inc.
a corporation of Delaware

[54] TRANSISTORIZED CONTROL AND AMPLIFIER CIRCUITRY FOR A TELEVISION RECEIVER
9 Claims, 7 Drawing Figs.

[52] U.S. Cl. 178/7.3; 325/319, 325/405
[51] Int. Cl. H04n 5/52
[50] Field of Search 178/6 AVC, 7.5 E, 7.3 E; 325/404, 405, 411, 418, 419, 488, 318

[56] References Cited
UNITED STATES PATENTS

| | | | |
|---|---|---|---|
| 3,084,216 | 4/1963 | Tschannen | 325/405 |
| 3,205,444 | 9/1965 | Birkenes | 325/404 |
| 3,234,328 | 2/1966 | Massman | 178/7.3E |
| 3,328,714 | 6/1967 | Hugenholtz | 325/319 |
| 3,306,976 | 2/1967 | Massman et al. | 325/319 |

*Primary Examiner*—Richard Murray
*Assistant Examiner*—Alfred H. Eddleman
*Attorneys*—Norman J. O'Malley, Cyril A. Krenzer and Thomas H. Buffton

ABSTRACT: Solid state television receiver automatic gain control and amplifier circuitry providing reverse AGC bias of the IF stage and forward AGC bias of the RF tuner-amplifier including a low pass filter network in the IF stage providing control of the AC to DC gain of the IF stage and further providing a component of AC coupling from the AGC stage to the IF stage when the direct current component of the AGC supplied to the IF stage is fixed.

INVENTORS
KAROL SIWKO &
JOSEPH E. THOMAS
BY
[signature]
ATTORNEY

INVENTORS
KAROL SIWKO &
JOSEPH E. THOMAS

BY

[signature]

ATTORNEY

TRANSISTORIZED CONTROL AND AMPLIFIER CIRCUITRY FOR A TELEVISION RECEIVER

BACKGROUND OF THE INVENTION

In a television receiver, as well as other communication equipment, it is necessary to supply a relatively constant signal output for a wide range of received signal levels. This is generally accomplished through the use of automatic gain control circuitry (AGC) employing various circuit techniques well known to those skilled in the art of receiver design. The AGC control voltage or current is used to control the gain of one or more amplifier stages in the receiver. In television systems the transmitted signal includes synchronization pulses operative at the receiver to correlate the scan of the image display tube in the receiver with the scan that has been effected at the transmitter. Generally, the synchronizing pulses always bear a fixed relation to the amplitude of the remainder of the transmitted signal and therefore it has become convenient to key the AGC circuitry to the synchronizing pulses to properly control the receiver gain.

In television receivers it is often desirable to provide AGC for one or more of the intermediate frequency (IF) amplifier stages and for the radio frequency (FR) tuner-amplifier. However, in doing so, the amount of AGC applied to the RF tuner and the IF stages must be closely controlled. For example, too much IF attenuation may cause overload and crossmoduala-tion problems in the receiver mixer stage, whereas insufficient AGC in the IF stage and excessive AGC in the RF stage may give rise to poor signal to noise ratio at the mixer stage resulting in a "snowy" picture even with strong signals. The problem of providing adequate AGC is further compounded in the environment of solid stage circuitry which has relatively low impedance characteristics, thereby making it difficult to filter out extraneous alternating current components which may be developed in the AGC loop. This problem is typified by the well known "aircraft flutter" and "hum" and previously has been solved by adding additional stages of amplification with filter components therebetween. However, this is undesirable since it requires additional circuitry thereby increasing the complexity and cost of the receiver.

OBJECTS AND SUMMARY OF THE INVENTION

Accordingly, it is a principal object of this invention to provide improved transistorized control and amplifier circuitry for television receivers which overcomes the foregoing deficiencies of the prior art.

Another object of the invention is to provide improved transistorized control and amplifier circuitry which does not result in high frequency loading of the video amplifier stages.

Still another object of the invention is to provide improved transistorized circuitry for television receivers which does not required additional amplifier stages and hence effects economies in circuit design.

According to none aspect of the invention, there is provided a video IF amplifier stage and an AGC amplifier circuit which effects reverse bias of the video IF amplifier and forward AGC bias of the RF tuner-amplifier. Included in the video IF amplifier is a low pass filter network which allows the AC to DC gain of the video IF amplifier to be adjusted to compensate for deleterious signals which commonly occur and are low frequency in nature, thereby effectively reducing any beat note signal which may be developed in the AGC circuit from the system.

DESCRIPTION OF THE PREFERRED EMBODIMENTS

For a better understanding of the present invention, together with other and further objects, advantages, and capabilities thereof, reference is made to the following disclosure and appended claims in connection with the above-described drawings.

Figure 1:
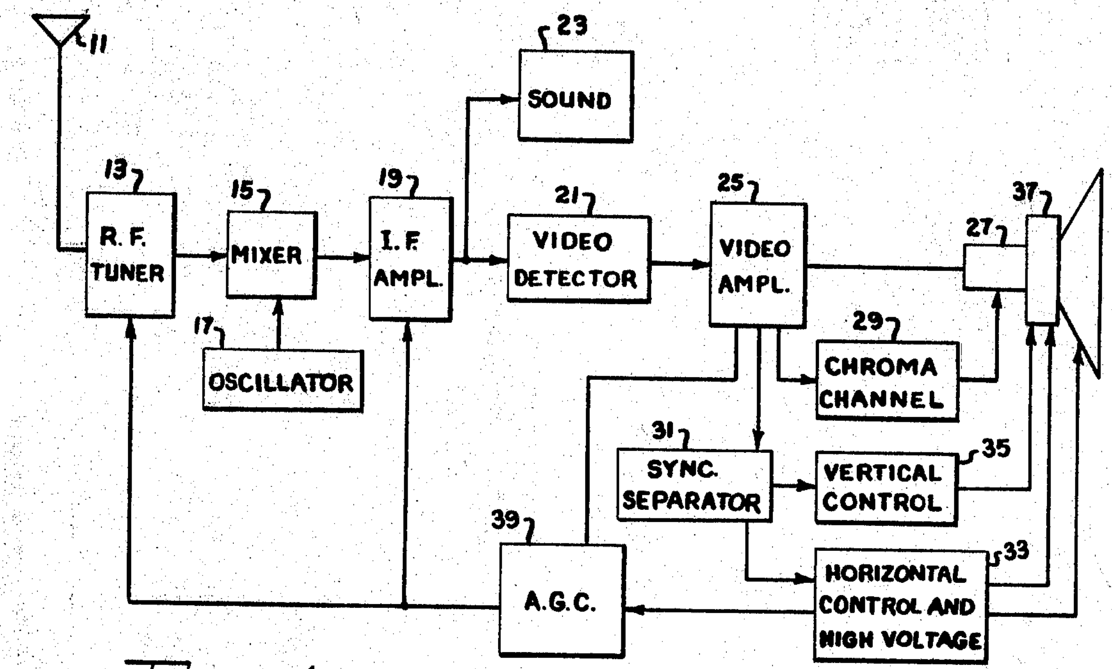
FIG. 1 is a block diagram of a television receiver in which the present invention finds utility.

In the block diagram of FIG. 1, the modulated RF signal from the antenna 11 is applied to the RF tuner-amplifier circuit 13 where the signal is amplified and fed to a mixer circuit 15. A local oscillator 17 provides a continuous wave signal to the mixer circuit such that the mixer is operative to heterodyne the RF signal down to an intermediate frequency which is coupled to the IF amplifier circuitry 19 the output of which is applied to the video detector 21 and the sound channel 23. In the sound channel the signal is suitably processed to reproduce the sound portion of the signal. The video detector strips the IF carrier from the composite video signal and provides an output to the video amplifier circuitry 25. In the video amplifier, the luminance portion of the signal is amplified and then applied to an input of the cathode ray tube display device 27. For a color receiver, the chrominance components of the video signal are coupled from the video amplifier to the chroma channel 29, where they are suitably processed and then applied to the cathode ray tube. Of course, in a monochrome receiver there is no chroma channel, and as will become evident the present invention is applicable to both monochrome and color receivers.

To develop the necessary control signals, an output from the video amplifier is coupled to the sync separator circuitry 31 which separates the horizontal and vertical synchronization pulse signals from the composite video signal and applied these pulse signals, respectively, to the horizontal control and high voltage circuitry 33 and the vertical control circuitry 35. The outputs of the horizontal and vertical control circuitry are applied to the deflection apparatus 37 mounted on the cathode ray tube display device and are operative to provide the requisite synchronized scanning of the cathode ray tube. A portion of the horizontal control signal is used to generate a high voltage which is applied to the cathode ray tube and, in addition, from the horizontal control circuitry a signal is coupled to the automatic gain control (AGC) network 39. An output from the video amplifier 25 is also coupled to the AGC network.

Figures 2, 5:
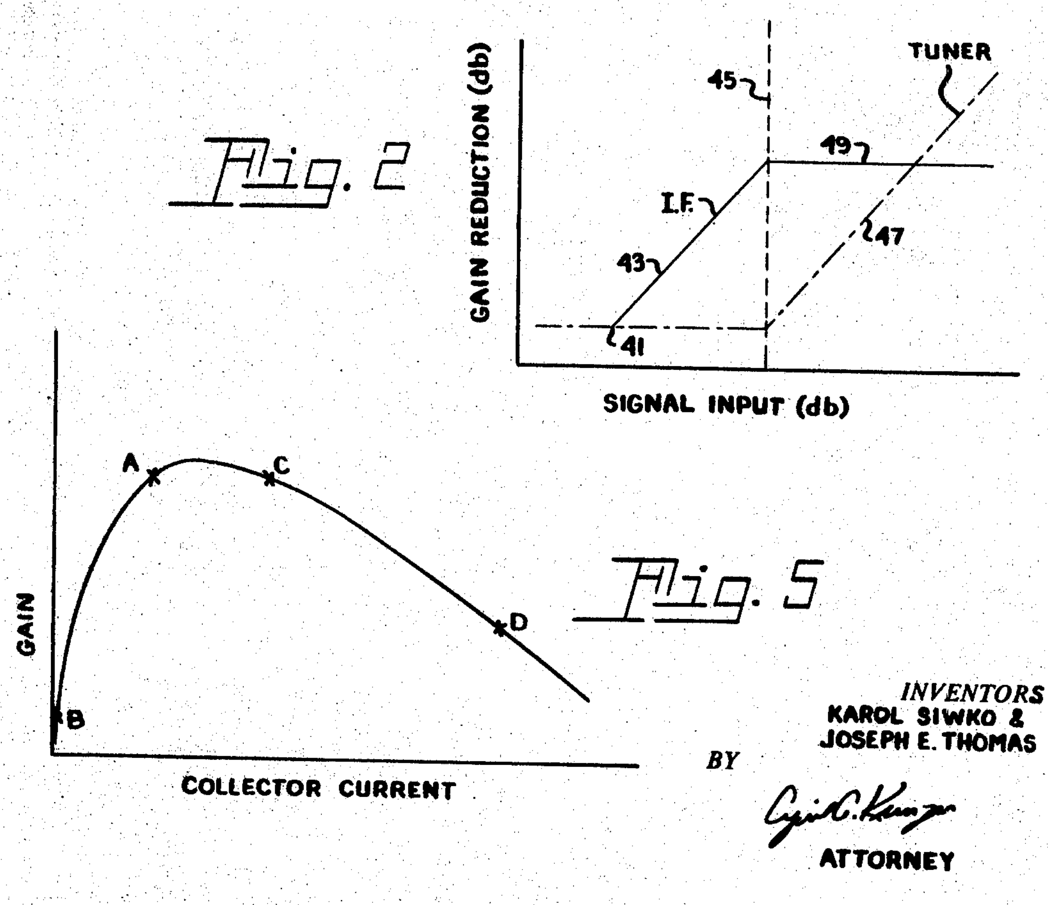
FIG. 2 is a signal diagram illustrating optimized gain reduction for a system utilizing a combination of RF and IF automatic gain control.
FIG. 5 is a signal diagram illustrating gain reduction as a function of collector current for a receiver using a combination of reverse IF AGC and forward RF AGC circuitry.

The AGC network develops gain control signals which are applied to the RF tuner 13 and one or more stages of the IF amplifier circuitry 19, operative to produce a uniform signal output to the video amplifier circuitry even though there may be wide variations in the strength of the receiver signal. This is accomplished by suitably reducing the gain of the IF amplifier and the RF tuner as the received signal strength increases. An optimum relative gain reduction as a function of received signal strength is illustrated in FIG. 2. For signals below a predetermined threshold level 41, there is no gain reduction. For input signals above the level 41, the gain of the If amplifier circuitry 19 is reduced as the signal strength increases, As indicated by the solid line 43, until the input signal strength reaches second predetermined level as indicated by the dashed line 45. For input signals above the lever 45, the IF amplifier circuitry gain remains relatively constant.

As further indicated in FIG. 2 by the dot-dash line 47, the RF tuner gain is relatively constant when the input signal strength is less than the signal level 45. However, as the input signal strength exceeds the level 45, the gain of the RF tuner-amplifier is reduced in accordance with the increased signal strength to thereby continue to maintain a relatively constant signal output. As can be seen in FIG. 2, the overall receiver gain reduction is the sum of gain reduction of the IF amplifier circuitry and the gain reduction of the RF tuner.

Figure 3:
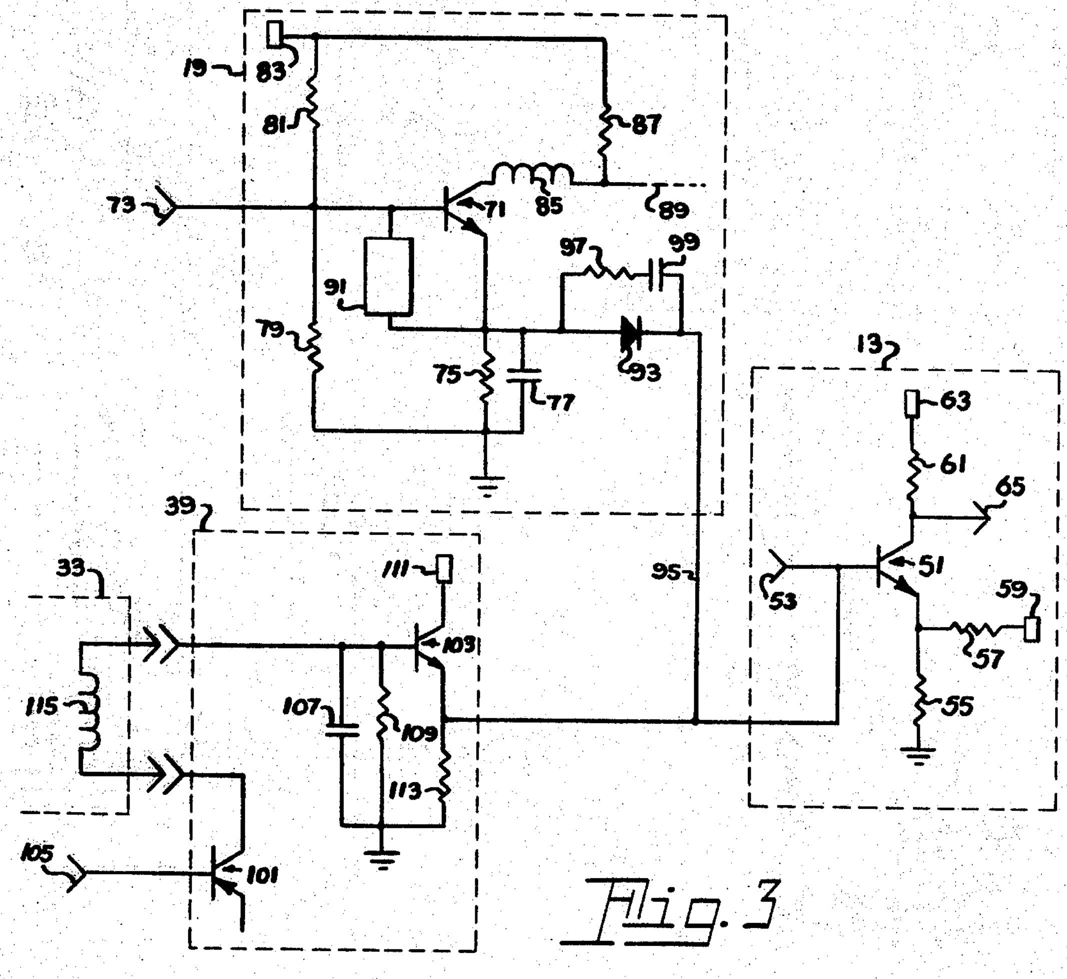
FIG. 3 is a schematic circuit diagram of video IF circuitry, RF circuitry and AGC circuitry according to the present invention.

Referring next to the schematic circuit diagram of FIG. 3, therein is shown a stage of the RF tuner-amplifier 13, a stage of the IF amplifier circuitry 19, part of the AGC circuitry 39 and a winding from the horizontal control and high voltage circuitry 33. The stage of the RF tuner-amplifier 13 includes a transistor 51 having its base electrode connected to a terminal 53 adapted to receive a signal from the antenna or a preceding stage of RF amplification. The emitter electrode of the transistor 51 is connected to ground via a resistor 55 and via a resistor 57 to a source of bias potential as represented by the terminal 59. A resistor 61 is connected between the collector electrode of the transistor 51 and a source of energizing potential as represented by the terminal 63. An output terminal 65 adapted to be coupled to the receiver mixer 15 or to a succeeding stage of RF amplification is connected to the collector electrode of the transistor 51.

The stage of the IF amplifier circuitry includes a transistor 71 having its base electrode connected to an input terminal 73 adapted to receive signals from the receiver mixer 15 or a preceding stage of IF amplification and having its base electrode connected to ground via a resistor 75 in parallel with a capacitor 77. The base electrode of the transistor 71 is also connected to ground via a resistor 79 and by a resistor 81 to a source of energizing potential as represented by terminal 83. The collector electrode of the transistor is connected by means of a coil 85 in series with a resistor 87 to the source of energizing potential 83 and the junction of the coil 85 with resistor 87 is coupled to an output terminal 89 adapted to be connected to a succeeding stage of IF amplification or to the video detector circuitry 21. A frequency selective device 91 is connected between the base and emitter electrodes of the transistor 71. A diode 93 is connected from the base of the transistor 71 to a lead 95 going to the AGC circuitry 39. A resistor 97 in series with a capacitor 99 is connected in parallel with the diode 93.

The automatic gain control circuitry 39 includes an AGC gate transistor 101 and an amplifier transistor 103. The base electrode of the gate transistor 101 is connected to an input terminal 105 adapted to receive a signal input from the video amplifier circuitry 25. The base electrode of the transistor 103 is connected to ground via a capacitor 107 in parallel with a resistor 109. The collector electrode of the transistor 103 is connected directly to a source of energizing potential as represented by the terminal 111 and the emitter electrode is connected to ground by means of a resistor 113. An output taken from the emitter electrode of the transistor 103 is applied in parallel to the base electrode of the transistor 51 in the RF tuner-amplifier 13 and via the diode 93 to the emitter electrode of the transistor 71 in the IF amplifier circuitry 19. A winding 115 from the horizontal flyback transformer of the horizontal control and high voltage circuitry 33 is coupled between the base electrode of the transistor 103 and the collector transistor 101.

Figures 4A, 4B, 6:
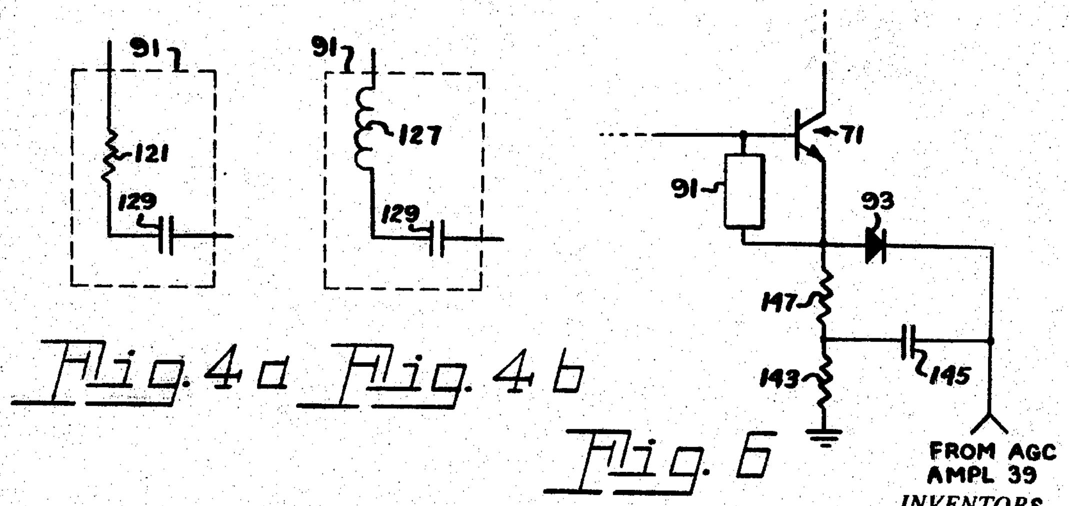
FIGS. 4*a* and 4*b* are partial schematic circuit diagrams illustrating alternate embodiments of the frequency selective network 91 of FIG. 3.
FIG. 6 is a partial schematic circuit diagram of an alternate embodiment of the video IF circuit of FIG. 3.

The frequency selective network 91 connected between the base and emitter electrodes of the IF amplifier transistor 71 may be of various configurations depending upon particular design requirements. For example, as shown in FIGS. 4*a* and 4*b*, the network may consist of a resistor 121 in series with a capacitor 123 or an inductor 127 in series with a capacitor 129.

The operation of the circuit of FIG. 3 may be more easily understood with reference to the signal diagram of FIG. 5. When a minimum signal is received, that is, maximum gain is required, minimum bias is developed at the base of the AGC transistor 103 and the transistor is nonconducting. The IF amplifier transistor 71 is biased in conduction for maximum gain by the proper selection of the resistors 79 and 81. The current flowing through the diode 93 and resistor 113 develops the conduction bias for maximum gain in the RF tuner-amplifier transistor 51, the quiescent bias level for which is set by the proper selection of the resistors 55 and 57. With these settings, both the transistors 51 and 71 are operating close to the point A of FIG. 5 and the overall gain reduction of the system is minimal as indicated by the point 41 on the curve of FIG. 2. For increased input signal levels, the bias at the base of the AGC transistor 103 increases and the transistor conducts thereby increasing the current through the resistor 113, which in turn reduces the gain of transistor 71 as indicated by the portion AB of the curve of FIG. 5. Still further increase of current through transistor 103 increases the voltage across the resistor 113 to a value higher than the voltage across the resistor 75 in the emitter circuit of transistor 71, thereby reverse biasing the diode 93. Hence, the diode becomes nonconducting and there is no current from the transistor 71 passing through the resistor 113. This corresponds to point C on the curve of FIG. wherein the direct current bias stability of the transistor 71 is enhanced, since any voltage change at the base of the transistor produces little current change through the resistor.

During the change in bias at the base of the transistor 103 due to increased signal strength, the increased voltage across resistor 113 will increase slightly the current through the RF tuner-amplifier transistor 51, as shown by the curve AC in FIG. 5 where the gain of the transistor 51 remains relatively constant. For yet higher signal strengths the voltage across the resistor 113 increases, thereby increasing the current through and reducing the gain of the transistor 51 as shown by the CD portion of the curve of FIG. 5.

To eliminate signal distortion due to slope detection in the IF transistor and to eliminate undesirable effects on synchronization, the alternating current gain of the AGC at the IF is reduced by connecting the frequency selective network 91 between the base and emitter electrodes of the transistor 71. Using the embodiment of FIG. 4*a*, the efficiency of transistor 71 to alternating current changes in the AGC is reduced by a factor of the parallel resistance combination of resistors 79 and 81 divided by the resistance of resistor 121. This is accomplished because the alternating current component of the AGC supplied across the resistor 75 is also coupled to the base of the transistor 71 through the resistor 121 and capacitor 123. The resistor 121 can assume any value depending on the effectiveness required. Where a very low value of resistance is desired, the circuit of FIG. 4*b* may be used with the inductance 127 chosen to give high impedance between the base and emitter of transistor 71 at signal frequencies, yet provides a low impedance to the deleterious low frequency AGC signal variations.

To further increase the system efficiency for good "hum" and "aircraft flutter" protection, it may be desirable to provide some alternating current coupling around the diode 93 such as by connecting in parallel therewith the resistor 97, capacitor 99 network. Thus, when the diode 93 is nonconducting so that the direct current bias conditions of transistor 71 remain constant as indicated by the curve 49 of FIG. 2, the alternating current portion of the AGC correcting voltage can be partly or wholly supplied to the transistor 71 stage of the receiver, thereby furthering improving its capability to handle alternating current changes. An alternate means for providing alternating current coupling around the diode 93 is shown in FIG. 6. Here the emitter resistance for the transistor 71 state consists of two resistors 141, 143 connected in series between the emitter and ground. A capacitor 145 is connected between the junction of the two resistors and the end of the diode 93 going to the AGC amplifier 39. This embodiment operates in essentially the same manner as the circuit of FIG. 3, with the amount of alternating current coupling around the diode 93 being determined by the values of the resistors 141, 143 and the capacitor 145.

It is therefore apparent that Applicants have provided an improved gain control circuitry of economic design having increased reliability and stability with reduced susceptibility to deleterious alternating current signals While there have been shown and described what are at present considered the preferred embodiments of the invention, it will be obvious to those skilled in the art that various changes and modifications may be made therein without department from the scope of the invention as defined by the appended claims.

We claim:

1. In a television receiver, improved signal translating and control circuitry comprising in combination:

a radio frequency tuner-amplifier circuit including a first transistor having emitter, base and collector electrodes; an input terminal adapted to be connected to the base electrode to thereby supply radio frequency signals thereto; and biasing means connected to said transistor to establish a quiescent direct current bias therefor;

an intermediate frequency amplifier circuit including a second transistor having emitter, base and collector electrodes; an input terminal connected to the base electrode to thereby supply intermediate frequency signals thereto; direct current biasing means connected to the base electrode of said second transistor; and resistance means connected between the emitter electrode of said second transistor and a point of reference potential;

an automatic gain control circuit including a third transistor having emitter, base and collector electrodes; a resistance-capacitance network connected between the base electrode of said third transistor and a point of reference potential; a first resistor connected between the emitter electrode of said third transistor and a point of reference potential; and, a source of signals, representative of the level of signals received by said receiver, adapted to be applied to the base electrode of said third transistor;

means connecting the emitter electrode of said third transistor to the base electrode of said first transistor;

a diode connected between the emitter electrode of said third transistor and the emitter electrode of said second transistor; and frequency selective means connected between the base and emitter electrode of said second transistor.

2. The invention according to claim 1 additionally comprising means for coupling alternating current signal components around said diode.

3. The invention according to claim 2 wherein said means for coupling alternating current signal components around said diode comprises a resistor in series with a capacitor connected in parallel with said diode.

4. The invention according to claim 1 wherein said resistance means connected between the emitter electrode of said second transistor and a point of reference potential comprises first and second resistors in series and additional comprising a capacitor connected from the junction of said first and second resistors to the emitter electrode of said third transistor.

5. The invention according to claim 1 wherein the frequency selective means connected between the base and emitter electrodes of said second transistor comprises an inductor in series with a capacitor.

6. The invention according to claim 1 wherein the frequency selective means connected between the base and emitter electrodes of said second transistor comprises a resistor in series with a capacitor.

7. In a television receiver having a signal source representative of the signal level received by the receiver and including at least one stage of transistorized radio frequency amplifier circuitry and at least one stage of transistorized intermediate frequency amplifier circuitry, improved automatic gain control circuitry comprising in combination:

an automatic gain control amplifier coupled to said signal source representative of a received signal level and having an output resistive means coupled to a potential reference level;

means for coupling said output resistive means of said automatic gain control amplifier circuitry to said radio frequency amplifier circuitry;

semiconductor device means coupling said output resistive means of said automatic gain control amplifier circuitry to said intermediate frequency amplifier circuitry; and a frequency selective network coupled in circuit with said intermediate frequency amplifier circuitry and operative in response to changes in alternating current from said automatic gain control amplifier circuitry for reducing the sensitivity of said intermediate frequency amplifier stage.

8. The combination of claim 7 including an alternating current coupling means connected in parallel with said semiconductor device means.

9. The combination of claim 8 wherein said alternating current coupling means is in the form of a series connected capacitor and resistor.